UNITED STATES PATENT OFFICE.

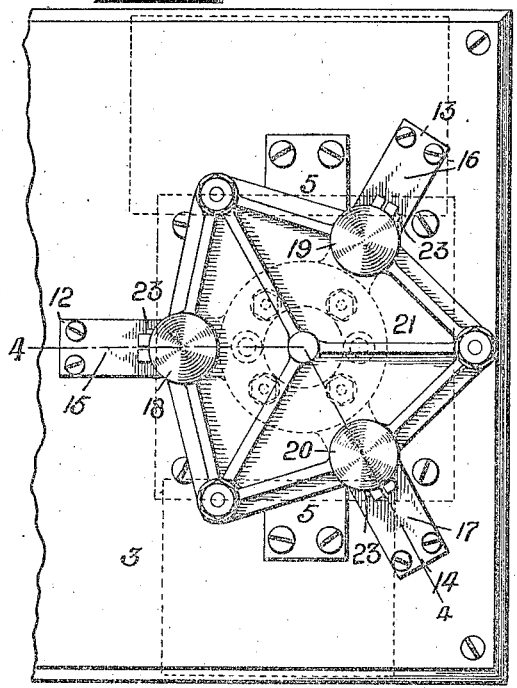
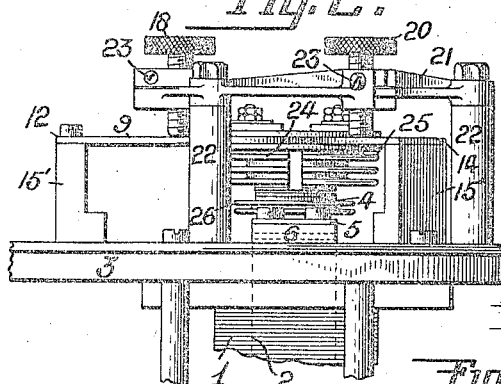
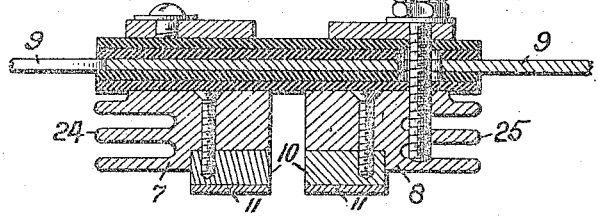
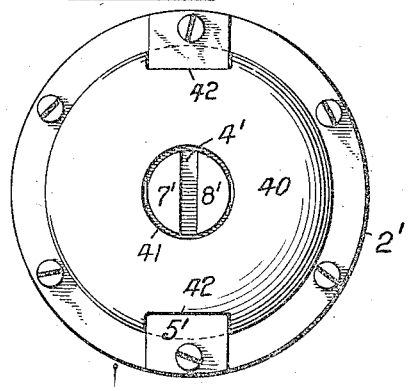
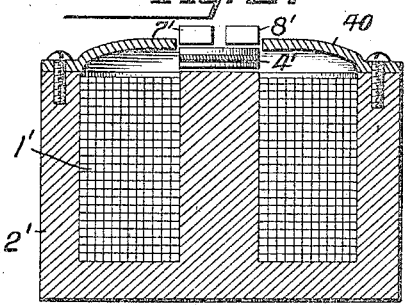
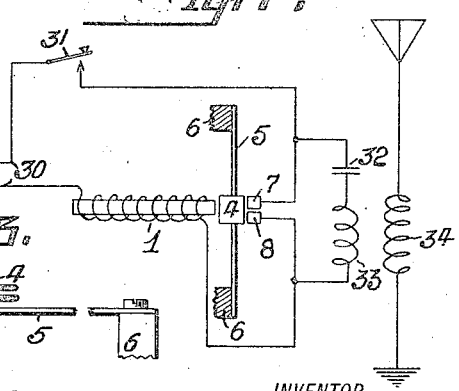

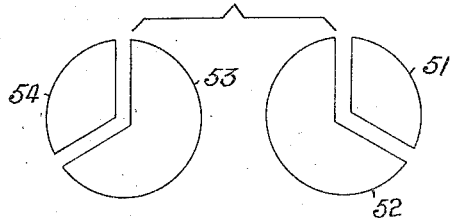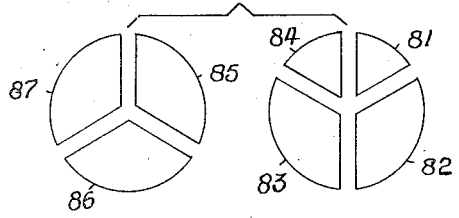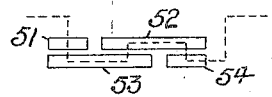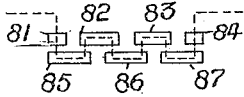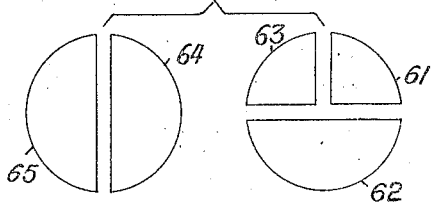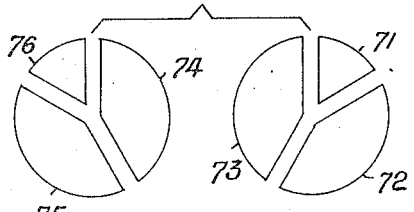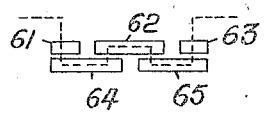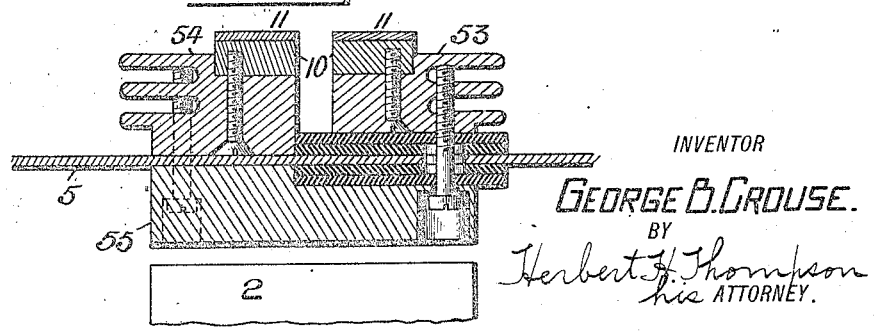

GEORGE B. CROUSE, OF BROOKLYN, NEW YORK, ASSIGNOR TO THE SPERRY GYROSCOPE COMPANY, OF BROOKLYN, NEW YORK, A CORPORATION OF NEW YORK.

SPARK-GAP.

1,399,005.                Specification of Letters Patent.        Patented Dec. 6, 1921.

Application filed June 14, 1918. Serial No. 239,913.

*To all whom it may concern:*

Be it known that I, GEORGE B. CROUSE, a citizen of the United States, residing at 493 Washington avenue, Brooklyn, in the county of Kings and State of New York, have invented certain new and useful Improvements in Spark-Gaps, of which the following is a specification.

This invention relates to radio transmitting apparatus, particularly to spark gaps and means for adjusting the electrodes thereof. From a more specific aspect, the invention relates to vibratory or buzzer sending apparatus capable of generating oscillations of radio frequency from a. d. c. source without the use of motor-generator or other similar means.

Radio transmitters have been proposed in which the closed or primary oscillating circuit is connected across the vibratory gap, or make and break contacts, of a buzzer excited from a suitable source. While my invention embodies various features capable of broad application, I have illustrated it in connection with the type of system above mentioned.

One of the principal objects of the present invention is to provide a novel form of adjusting means for a fixed electrode or electrodes of a spark gap.

Another object is to provide a vibratory gap, having a high quenching action. Other objects and advantages will appear as the invention is hereinafter developed.

Referring to the drawings which illustrate what I now consider the preferred forms of my invention;

Figure 1 is a plan view of my improved electro-magnetic make and break device.

Fig. 2 is a fragmentary elevation thereof.

Fig. 3 is a detail elevation of the vibratory contact or electrode and its support.

Fig. 4 is an enlarged sectional detail view of the fixed electrodes, taken on the line 4—4 of Fig. 1.

Figs. 5 and 6 are respectively a plan and elevation of a modification.

Fig. 7 is a wiring diagram illustrative of one form of connections of my invention.

Figs. 8, 10, 12 and 14 are diagrammatic plan views illustrating certain modifications in the numbers and arrangement of the gap contacts or electrodes.

Figs. 9, 11, 13 and 15 are developments of the gaps illustrated diagrammatically in Figs. 8, 10, 12 and 14 respectively, and Fig. 16 is an enlarged sectional detail elevation of a vibratory block illustrating how a plurality of contacts or electrodes may be actuated by the block.

Referring to Figs. 1 to 4, it will be seen that I have shown an electro-magnet or solenoid 1, having a core 2 of magnetic material mounted on a board or panel 3 and projecting therethrough. The core 2 when magnetized, is adapted to attract a block 4, preferably entirely of magnetic material except for a layer of silver, which will hereinafter be more specifically referred to. The block 4 is carried by a resilient plate 5, secured at a plurality of points spaced from each other, but substantially equidistant from the block. In the illustrated embodiment, this plate 5 is shown in the form of a strip of steel or other suitable resilient material anchored at opposite ends to blocks 6, secured to the board 3, the block 4 being substantially in the center of the strip.

While a single fixed contact may be employed in conjunction with block 4 to make and break the circuit of solenoid 1, I prefer to employ a plurality of fixed contacts adapted to be bridged by the blocks 4. Thus I have shown two contacts or electrodes 7 and 8 of brass, copper or other suitable electrical conducting material secured to a plate 9. These electrodes are insulated from each other and from plate 9 and are preferably sector shaped in cross-section. While the faces of the body portion of electrodes 7 and 8 may be employed as the arcing faces, I prefer to provide blocks of copper or other good heat conducting material 10, faced with a layer of silver 11. The faces 11 are adapted to be engaged and bridged normally by the upper face of the block or contact 4, which is also faced with silver:

In order to adjust the faces 11 toward and away from contact 4, and to bring the plane of said faces 11 into parallel relationship with the arcing face of contact 4, the structure illustrated in Figs. 1, 2 and 4 may be employed. The plate 9 is constructed of resilient material and fixed at a plurality of points, preferably equi-angularly spaced on the arc of a circle. This may be accomplished by securing the plate at 12, 13 and 14 to standards 15' secured to the board 3. The plate 9 may be cut away to form legs 15, 16 and 17. By exerting pressure on one or more of these legs between the points of support 12, 13 and 14 and the center of the plate, the latter may be flexed and the faces 11 moved toward the block 4 or brought into a position parallel to the arcing face of the latter. For exerting such pressures and for holding the fixed electrodes in adjusted position I provide a plurality of set screws 18, 19 and 20 mounted in a plate 21, secured to board 3 by means of standards 22. By turning all of said set screws the same amount and in the same direction the contacts or electrodes 7, 8 are moved bodily toward or away from the movable electrode 4 and by adjusting one or two an amount different from that of the other two or one the angle of the plane of the faces 11, with respect to the plane of the arcing face of electrode 4, may be varied. Lock screws 23 may be provided to hold the parts in adjusted position.

Numerous advantages are gained by employing a plurality of fixed electrodes and a bridging electrode instead of simply two electrodes, one fixed and the other movable. Thus it is not necessary to carry current through spring 5, or by means of a flexible lead to the vibratory block 4, either of which would interfere with proper and uniform periodicity of vibration of the vibratory block. Furthermore, as will be hereinafter more specifically pointed out, by employing a plurality of fixed electrodes 7, 8, a plurality of gaps in series are obtained, so that for any given amplitude of vibration of the block 4, the total effective gap length greatly exceeds that which would be obtained by the ordinary make and break contacts. Thus the rate of elongation of the spark may be made very high without decreasing the frequency of vibration, so that a highly quenched effect is obtainable without sacrificing the advantages of a high note.

I wish to point out also that the quenching action of the gap 7, 4, 8 is greatly enhanced by virtue of the silver arcing faces and by virtue of the fact that the contact blocks or electrodes are of comparatively large size, and therefore dissipate the heat rapidly. Radiating fins 24, 25 and 26 may be provided on the electrodes 7, 8 and 4, respectively to increase the heat dissipating surface. It will also be noted that as the entire block 4, with the exception of its relatively thin silver arcing face, is of magnetic material, a considerable part of the flux due to solenoid 1, will traverse the gap so that the magnetic blow-out or quenching action of the latter is of a high degree.

In view of the foregoing description and calling attention to Fig. 7, the operation of my invention will be readily understood. The solenoid 1 is connected in series with electrodes 7, 8 and key 31 across d. c. or a. c. mains 30. The closed oscillating circuit comprises, in series, the electrodes 7, 8, capacity 32 and the primary 33 of an oscillation transformer. While a direct or auto-transformer coupling may be employed, I have illustrated an inductive coupling between the closed or primary oscillating circuit and the open or aerial circuit. Thus the oscillation transformer comprises a secondary 34 connected in the antenna circuit. Normally, the electrode 4 engages and bridges electrodes 7 and 8, so that when the key 31 is closed, the solenoid 1 is energized to cause the electrode 4 to be attracted by the core 2. A spark forms, due to opening of the gap, from 7 to 4 and 4 to 8, the distance between electrodes 7 and 8, being sufficient to prevent discharge directly across these electrodes. The condenser is charged to a high voltage due to the inductance of the generating circuit 31, 7, 8, 1 and discharges across the gap, thus producing oscillating currents in the closed oscillating circuit, which are transferred to the antenna circuit and radiated. Obviously, when the spark across the gap is broken, the spring 5 restores the parts to normal position, so that the above cycle will be repeated so long as the key is closed. By virtue of the highly quenched characteristic of the gap, the maximum energy may be radiated at a definite wave length, due to the fact that although the coupling employed may be very close retransfer of energy between the oscillating circuits is avoided.

The magnetic flux through the gap and therefore the quenching action, may be further increased by employing the structure illustrated in Figs. 5 and 6, or the equivalent thereof. In these views, the elements 1', 2', 4', 5', 7' and 8' correspond to the elements 1, 2, 4, 5, 7 and 8 in the previous figures. The member 2', which is of magnetic material, is of such shape as to provide, in conjunction with solenoid 1', an electro-magnet of the iron clad type. A cover plate 40 of magnetic material is secured to member 2' and provided with a central opening 41 to accommodate the gap and with openings 42, through which the strip 5' extends. It will be understood that the representation of elements 4', 7' and 8' is somewhat diagrammatic and that these elements may assume the form of elements 4, 7 and 8.

By virtue of the structure last described, it will be seen that there will be a considerable flux density through the gap giving an extremely high quenching action.

In the above description I have pointed out some of the advantages of a plurality of gaps in series and have described a form of invention in which two gaps in series are obtained. This number of gaps in series may be increased as illustrated diagrammatically in Figs. 8 to 15 or in an equivalent manner.

Calling attention to Fig. 8 it will be seen that I have illustrated a plurality of fixed contacts or electrodes 51 and 52 and a plurality of vibratory contacts 53, 54. The former may be mounted in the same manner that contacts 7 and 8 are mounted in Fig. 4, and the latter may be mounted as shown in Fig. 16. The contacts or electrodes 53, 54 are carried by the resilient members or strip 5 and while one, 54, is in electrical contact with said strip the other, 53, is insulated therefrom. The member 55, to which the electrodes 53, 54 are secured, is of magnetic material as are also the electrodes 53, 54, except for the layer of silver provided on the arcing faces of the latter.

The normal position of the parts in this form of gap may be visualized by assuming that the contacts 51, 52 are superimposed on and in contact with the contacts 53, 54. If current is introduced at electrode 51 it will flow downwardly into electrode 53, through the latter, upwardly into electrode 52, through the latter, downwardly into electrode 54 and out. When the armature 55 is attracted the electrodes 53 and 54 will be moved out of engagement with electrodes 51, 52 and three gaps in series will be formed as indicated in Fig. 9.

Four gaps in series may be obtained by employing the arrangement illustrated in Figs. 12 and 13 in which current is introduced at the fixed electrode 61, flows downwardly into and through vibratory electrode 64, upwardly and through fixed electrode 62, downwardly and through vibratory electrode 65, upwardly to fixed electrode 63 and out. Obviously when the gap opens four gaps in series are obtained as indicated in Fig. 13. Five gaps in series may be obtained by means of the arrangement illustrated in Figs. 14 and 15 and six by means of the arrangement shown in Figs. 10 and 11. More gaps in series may be obtained by carrying forward the idea of means herein illustrated.

If it is desired to employ any of the gaps illustrated in Figs. 8 to 15 instead of the two gap type illustrated in Figs. 1 to 6, the electrodes 51 and 54, or 61 and 63, or 71 and 76, or 81 and 84 may be connected to the system illustrated in Fig. 7 instead of electrodes 7 and 8. It will be noted that when an arrangement is employed in which an even number of gaps is obtained the conducting leads are connected to fixed electrodes. In this case the electrodes carried by strip 5 may each be insulated from each other and from the strip.

With an odd number of gaps, however, one of the electrodes carried by said strip 5 acts as a terminal electrode as illustrated at 54 and 76. Connection may be established with this electrode by mounting it in electrical contact with strip 5 to which the lead or conducting wire may be connected.

In accordance with the provisions of the patent statutes, I have herein described the principle of operation of my invention, together with the apparatus, which I now consider to represent the best embodiment thereof, but I desire to have it understood that the apparatus shown is only illustrative means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A spark gap for radio transmission, comprising a vibratory electrode substantially entirely of magnetic material, electromagnetic means for vibrating said electrode and a plurality of insulated electrodes normally bridged by said vibratory electrode.

2. A spark gap for radio transmission, comprising a vibratory electrode substantially entirely of magnetic material, electromagnetic means for vibrating said electrode, a plurality of insulated electrodes normally bridged by said vibratory electrode and radiating fins on said electrodes.

3. A spark gap for radio transmission, comprising a vibratory electrode, substantially entirely of magnetic material, electromagnetic means for vibrating said electrode, a plurality of insulating electrodes, normally bridged by said vibratory electrode, a layer of silver on the arcing faces of said electrodes and radiating fins on said electrodes.

4. A spark gap for radio transmission comprising a plurality of electrodes, a plate supporting at least one of said electrodes and means for flexing said plate about at least two axes.

5. A spark gap for radio transmission comprising a plurality of electrodes, a plate supported at a plurality of spaced points and carrying at least one of said electrodes and means for exerting pressure on said plate at a plurality of spaced points.

6. A spark gap for radio transmission comprising a plurality of electrodes, a plate supporting one of said electrodes, means for supporting said plate at at least three spaced points and adjustable means for exerting pressure on said plate between the points of support thereof and the electrode supported by said plate.

7. A spark gap comprising a plurality of fixed electrodes, one of which is a terminal electrode and at least one other a bridging electrode, and a plurality of vibratory electrodes, one of which is a bridging electrode.

8. A spark gap comprising a plurality of fixed electrodes, two of which are terminal electrodes, and a plurality of vibratory bridging electrodes.

In testimony whereof I have affixed my signature.

GEORGE B. CROUSE.